United States Patent [19]
Godat et al.

[11] 4,379,496
[45] Apr. 12, 1983

[54] WEIGHT MEASURING BALANCE

[75] Inventors: Jean Godat, Olivet; Jean Paget, Breuillet St. Yon, both of France

[73] Assignee: Fonderie & Ateliers des Sablons, France

[21] Appl. No.: 242,400

[22] Filed: Mar. 10, 1981

[30] Foreign Application Priority Data

Mar. 28, 1980 [FR] France ............................ 80 06975

[51] Int. Cl.³ .................................................. G01D 19/22
[52] U.S. Cl. ........................................ 177/25; 177/70; 177/DIG. 3
[58] Field of Search ............... 177/25, 45, 70, 177, 177/165, DIG. 3

[56] References Cited
U.S. PATENT DOCUMENTS

| | | | |
|---|---|---|---|
| 3,959,636 | 5/1976 | Johnson | 177/70 X |
| 4,076,088 | 2/1978 | Gallo | 177/177 X |
| 4,114,706 | 9/1978 | Realini | 177/70 |

Primary Examiner—Joseph W. Hartary
Attorney, Agent, or Firm—Scully, Scott, Murphy & Presser

[57] ABSTRACT

This invention relates to a weight measuring balance especially adapted for the proportioning of a liquid product mixture from cumulative formulas expressed in weight.

The balance comprises a pan borne by a centrally fixed stress gauge captor, mounted upon a fixed frame and which furnishes a signal representative of the load's weight, whatever may be the position of the load on the pan, to a measuring device carrying out the display of the weight thus detected on a first display device.

The invention is especially applied to the formulations of paints used in automobile body shops from cumulative formulas expressed in weight.

5 Claims, 5 Drawing Figures

WEIGHT MEASURING BALANCE

BACKGROUND OF THE INVENTION

1. Field of the Invention

The present invention relates to a weight measuring balance adapted especially, but not exclusively, for the proportioning of a liquid product mixture such as paints used in automobile body shops from cumulative formulas expressed in weight.

2. Description of the Prior Art

To carry out such proportioning, weight measuring balances, either of a common type of those slightly modified, are presently being used.

However, this solution presents numerous drawbacks mainly due to the fact that conventional balances are often fragile devices which necessitate frequent adjustments to preserve their accuracy.

Therefore, the use of these balances is not suitable for personnel who are unfamilar with proportioning techniques as is often the case in automobile body shops.

SUMMARY OF THE INVENTION

The invention has for its objective the elimination of all these drawbacks.

It proposes a balance of simple design, sturdy and accurate, which includes none of the previously described adjustments, the result being obtained from the fact that its operation is considerably static and involves no movable precision elements.

The balance according to the invention essentially comprises, therefore, a pan carried by a centrally attached stress gauge mounted on the fixed frame of the balance supplying a signal representative of the load's weight whatever its position on the pan may be, transmitted to a measuring device carrying out the display of weight thus detected on a first display device.

According to another characteristic of the invention, to facilitate the production of mixtures from cumulative formulas, said measuring device additionally includes a preselection circuit comprising:

a keyboard upon which can be entered the weight of a predetermined product quantity to be carried on the pan of the balance (this weight is indicated in the cumulative formula; it corresponds to the cumulative product quantity already added plus the new product quantity that is to be added);

a second device allowing the display of the initial weight which has just been entered;

a device permitting the decrease of the initially displayed value as a function of the product quantity added upon the balance and which is indicated on said first display device (the return to zero of the second display device signifies, therefore, that the predetermined product quantity has been added) and optionally:

a signalling device which makes it possible, as the value shown by the second display device approaches zero, to visualize the level (in weight) of the quantity actually added in relation to the predetermined quantity that is to be added upon the balance pan (this level can, for example, be represented by a luminous level moving on a luminous scale), and a device making it possible to obtain the weight of each of the successively added products, from the last cumulative total displayed by the first display device and the new cumulative total entered on the keyboard, by subtracting the last cumulative total from the new cumulative total. This subtraction then provides a difference quantity which is the weight of only the new product to be added.

BRIEF DESCRIPTION OF THE DRAWING

An embodiment of the invention will be described hereafter, as a non-limiting example, referring to the attached figures of drawing in which.

DESCRIPTION OF THE PREFERRED EMBODIMENTS

Figure 1:
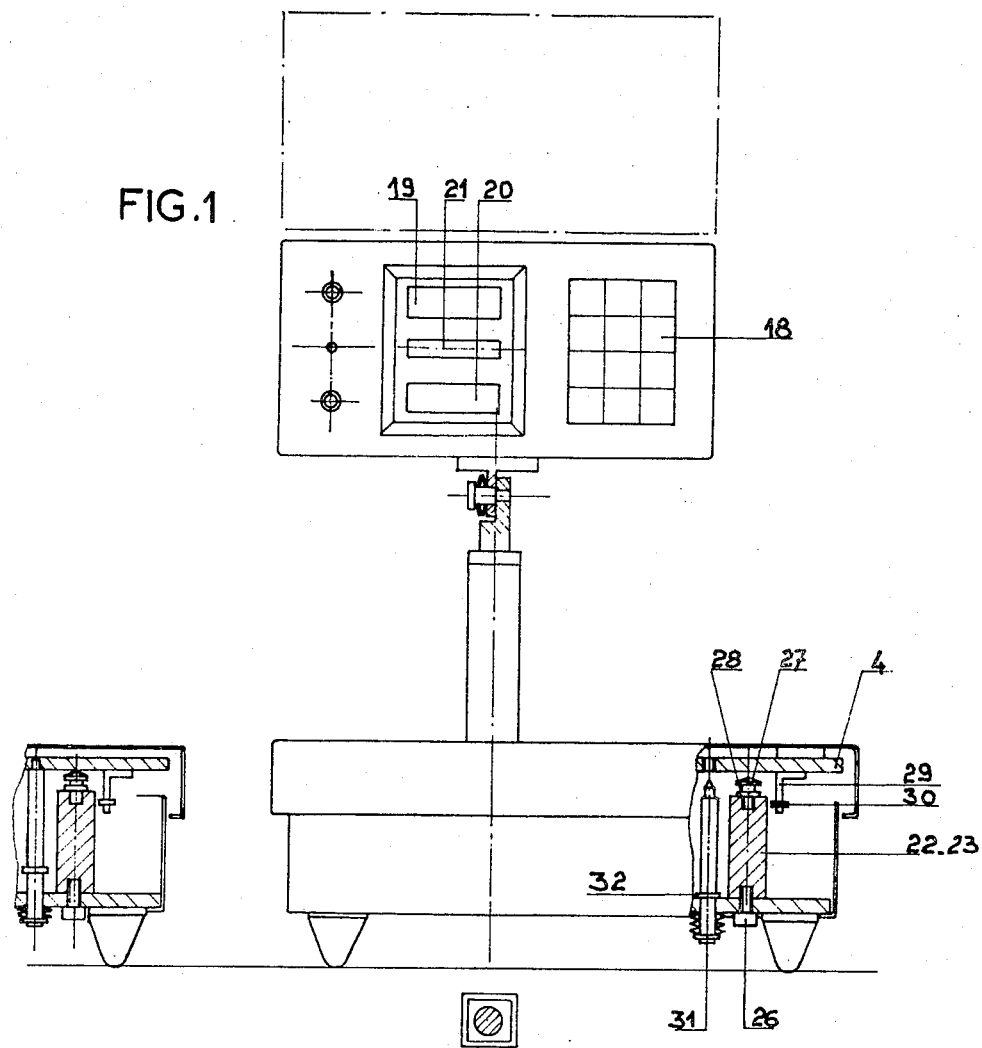
FIG. 1 represents a balance, front view, in partial section.
Figure 2:
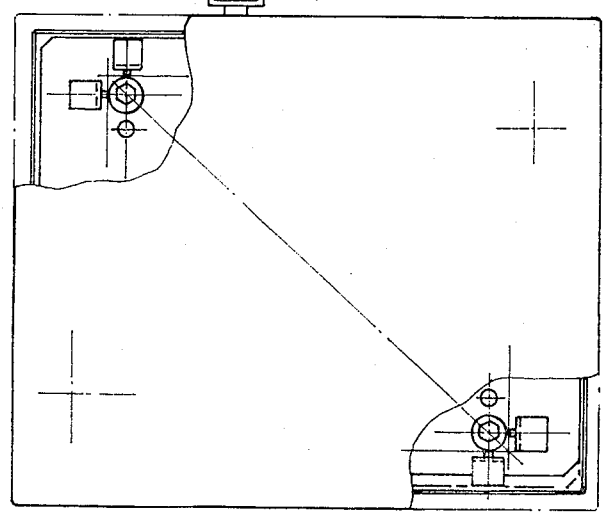
FIG. 2 is a plan view in partial section of the balance represented in FIG. 1.
Figure 3:
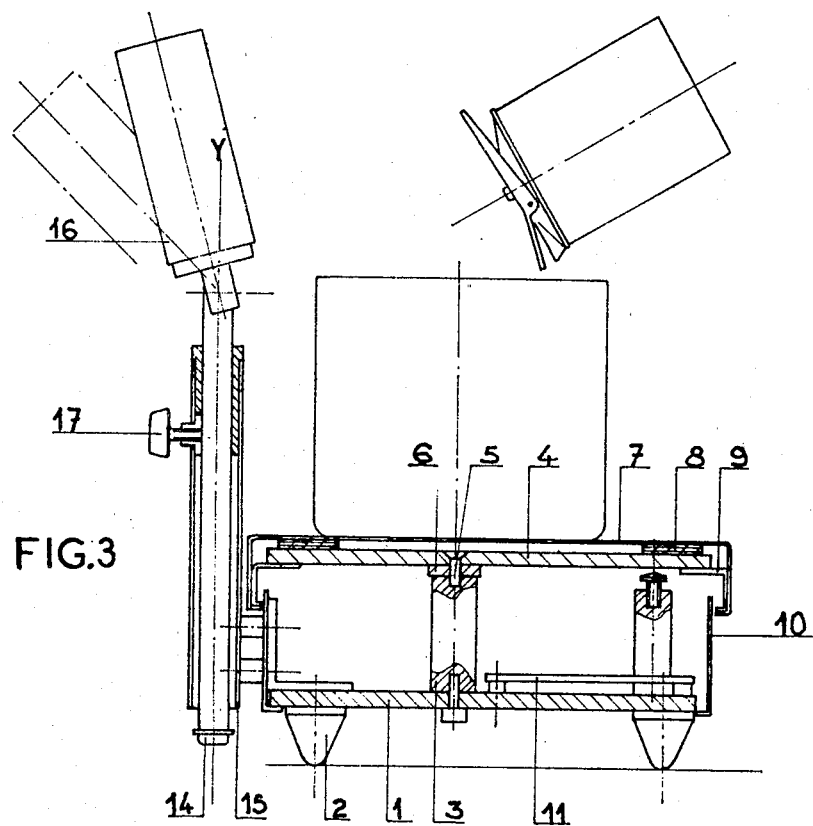
FIGS. 3 and 4 represent, in vertical longitudinal section (FIG. 3) and in horizontal section (FIG. 4), the balance illustrated in FIGS. 1 and 2; and, FIG. 5 is a simplified electrical diagram of the measuring circuit incorporated in the balance.
Figure 4:
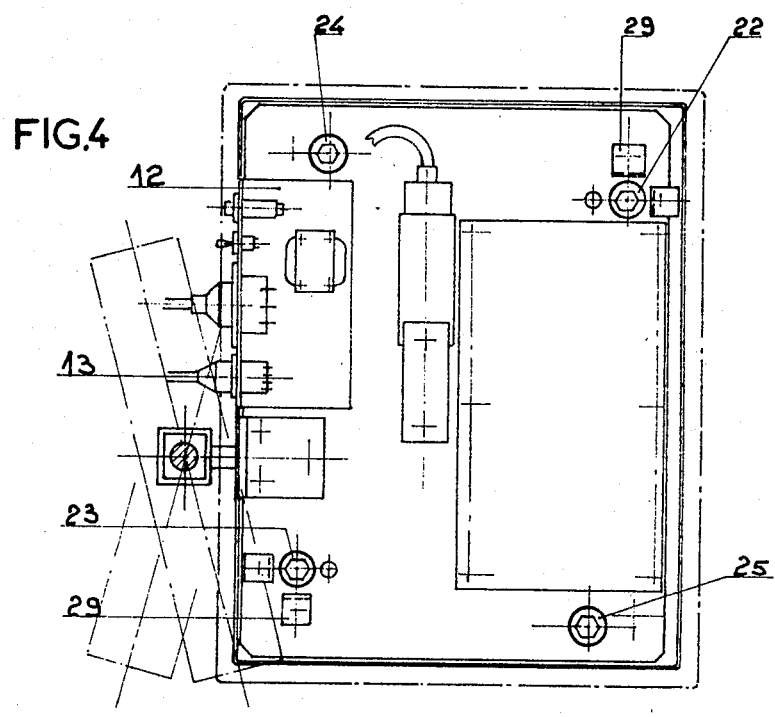

Referring to FIGS. 1 through 4, the balance comprises a stand 1 which rests upon four anti-vibratory legs 2. Upon this stand there is rigidly fixed a stress gauge 3 which, by itself, supports at its upper part a plate 4 rigidly fixed by two screws 5 through a brace 6.

Upon plate 4 there rests a stainless steel pan 7 by means of four elastic insets 8 to distribute the stress. Two braces 9 prevent the pan from being lifted off the plate 4. The assembly is protected from dust by a housing 10 also fabricated of stainless steel.

Upon stand 1, electronic measuring circuit 11 and power and control board 12 have also been attached, the latter comprising the power imput, a fuse, a switch and cable 13 leading into display panel 16.

A column 14 slides in a tube 15 integral with stand 1 and bears, at its upper end, display panel 16. The latter is inclinable in two directions around horizontal axis Y by a friction fitting around the shaft of column 14, the latter capable of being fixed in rotation and in the vertical direction by hand lever 17.

This arrangement has the advantage of allowing the operator both an adjustment of the display panel corresponding to the height of the vessel used and also corresponding to the best visibility and illumination, it being given that, when the product is poured in the vessel, the operator must at the same time watch the stream flowing into the vessel and the quantity poured which is indicated upon the display panel.

On the right side of the display panel is positioned a keyboard 18, a basic quantity counter display 20, an adding counter 19 and a bank of light emitting diodes (LEDs) 21 the functions of which are described hereafter in connection with the electronic circuit.

Furthermore, certain precautions have been taken to avoid dangerous overloads upon the stress gauge, for example, during the transport or the handling of the apparatus.

For the purpose, to limit movement, four vertical columns 22, 23, 24 and 25 have been provided which are diagonally arranged and rigidly fixed upon the base plate by screws 26.

At the upper end of these columns, screws 27 and lock-nuts 28 make it possible to prevent upper pan 4 from fully descending either when a load greater than the permissible limit is placed upon the pan or in case of mechanical shock.

In addition, columns 22 and 23 are used to limit horizontal movement. To achieve this, four right-angle brackets 29 are fixed upon the upper pan and provided with adjustment screws 30 which can be fixed by a lock-nut or by a special bonding product, these screws being adjusted a minimum distance away from the columns so as to avoid an overload without, however, risking their contact with the columns which would introduce measurement errors.

It will be observed that the four screws 30 function as the four corners of a square, in such a way that the pan can be perfectly positioned in the two directions of the plane.

Finally, a device 31 has been provided made up by two rods whose threaded ends can be fixed in the upper pan after compressing spring washers, which in holding tightly the pan against the screws of stop 27, avoid all abnormal stress and vibration during transport, which could be transmitted to the stress gauge damaging it.

It is evident that, upon being put into service, the two devices 31 are released which fall by their own weight up to stop 32 made up by a retaining ring avoiding, therefore, all contact with the pan.

As previously mentioned, the balance uses a centrally fixed stress gauge device 3. This type of gauge is, in principle, independent from the load position on the pan and is made up of a heavy deformable parallelogram provided with four bridge-arranged stress gauges and compensated as to temperature.

Figure 5:
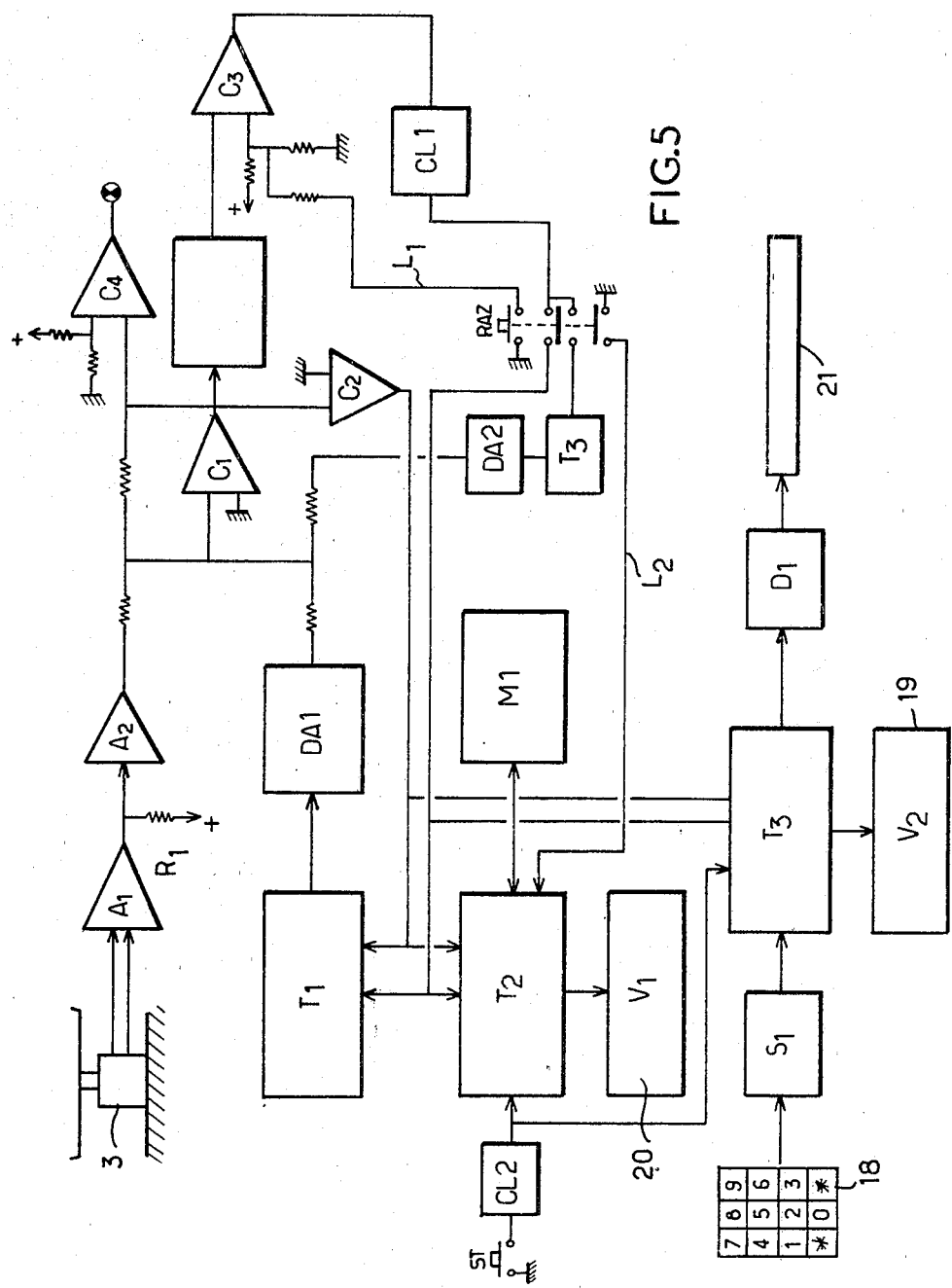

The very low output voltage of this bridge is amplified (FIG. 5) by two amplifiers A1 and A2. Between A1 and A2, a current through a resistor R1 introduces a rough adjustment for the weight of the empty pan. From the output of A2, a current proportional to the load is directed to the input of a comparator C1.

Furthermore, a counter T1 followed by a digital to analog converter DA1 sends to the input of the same comparator C1 a current proportional to its contents but with an opposite polarity relative to the preceding one. The latter has for its role the comparison of these two currents in order to obtain, if a difference is produced in one direction or in the other, that counter T1 begins to count in a direction such that the equilibrium will be restored. The variation of contents of T1 will therefore always be equal to the variation of the load to be measured.

To obtain a counting by counter T1, two controls are necessary:

a. one indicating the direction of the count and,
b. the other sending timed impulses.

Counting direction is defined by a second comparator C2 placed at the output of C1 which detects the direction of the imbalance.

The timed impulses are generated by circuit CL1 which is triggered by threshold comparator C3. This threshold is made necessary by the fact that the counter must advance (or count down) only when the imbalance exceeds the value of a half division on the weighing scale.

Between C1 and C3, a filter circuit introduces a certain delay in the triggering of the timer so that the counter will not follow rapid load variations due to vibration, which would make read-out very difficult.

A second counter T2 operating at the same time as T1 and in the same direction is employed for displaying the load value through display device V1. It is provided with a zero setting circuit making it possible, according to whether the pan is empty or a vessel is placed there, to set either the zero or the error allowance of the balance.

This zero setting circuit comprises a triple commutator switch RAZ activated by a key permitting the reduction of the threshold of comparator C3 to $\frac{1}{8}$ a division (circuit L1) to connect the output of the timing generator to an auxiliary counter T4 whose output is connected to comparator C1 through a numerical analog convertor DA2 and to obtain the zero setting of counter T2 (grounded by circuit L2).

At each zero resetting, an auxiliary counter T4 counting by $\frac{1}{8}$ divisions and followed by digital to analog converter DA2 comes into play in order that the residual difference in output of comparator C1 be lower than $\frac{1}{4}$ division in order to achieve control in the matter. This is obtained in switching the timing impulses toward this auxiliary counter, in reducing the threshold of comparator C3 to $\frac{1}{8}$ a division and is confirmed by the lighting up of the zero indicator light controlled by a comparator C4 whose threshold is $\frac{1}{4}$ division.

In order to facilitate the use of this balance, a device is attached to it which permits the user to enter on a keyboard the new cumulative weight of the material already on the balance and the new material to be added. This weight then appears on a second electrical display device V2 whose contents keep on decreasing at the time of load increase and whose arrival to zero will be a sign that the quantity desired is reached.

The value entered on keyboard 18 is stored in time lag register S1, then is used to preselect counter T3 whose content is displayed by display device V2. This last counter receives the same timed signals as T2 but the instructions of adding/subtracting are reversed. The counter keeps on deducting, therefore, when the load increases by a value equal to the one whose T2 will have computed and, at the time of its arrival to zero, T2 will have computed a value equal to the one entered on the keyboard.

Furthermore, in order to facilitate the read out of the remaining quantity to be added toward the end of the operation, display device V2 has a scale of light luminescent diodes controlled by decoder D1 and on which a emitting point enters in movement when the contents of T3 becomes lower than 200 g. The movement of the luminous point is on the order of 1 division for a value comprised between 100 g and 200 g then by 1 division for each additional 10 grams between 10 and 100 g, then by 1 division of a gram between 0 and 10 grams.

Finally, taking into account that the user generally does not have at his disposal the exact value of each load added but only the values accumulated with the preceding ones, a subtracting circuit has been attached. It allows, knowing the value of the last cumulative total which appears on weight display device V1 and the value of the new cumulative total entered on the keyboard and displayed on V2, to obtain through subtraction of V1 from V2 the value of the load added. This operation is carried out in temporarily memorizing the contents of T2 in the memory M1 then in ordering the deduction of T2 up to zero with the help of an auxilary timer CL2 triggered by subtraction switch ST. This timer also controls in subtraction, counter T3 which, therefore, keeps on diminishing, subtracting from the count in counter T3 the count originally contained in T2. This being obtained, counter T3 now has a count therein equal to only the new material to be added, and counter T2 is reloaded with the contents of memory M1 and retakes, therefore, its initial value.

What is claimed is:

1. A weight measuring balance for proportioning a liquid product mixture from cumulative formulas in weight furnishing the weight of each of the products added, cumulative with the weight of the products previously added, including a pan supported by a gauge which furnishes a signal representative of the weight of the load, comprising:
   a. a first display for displaying the weight detected by said gauge, which is equal to the weight of the load of materials already on the pan;
   b. a keyboard on which is entered the weight of a new cumulative weight of products to be on said pan, which is indicated in the cumulative formula, which weight corresponds to the sum of the quantity of products already loaded, plus the quantity of the new product to be loaded;
   c. means for subtracting the weight of the products already loaded on said pan from the new cumulative weight of products to obtain only the weight of the new material or product to be loaded;
   d. a second display for initially displaying the weight of the new material or product to be loaded as determined by said subtracting means;
   e. means for displaying on said second display a decreasing value from the initially displayed value of said second display in terms of the quantity of products loaded on the pan, so that a return to zero of said second display indicates that a given quantity of product has been loaded; and
   f. a signalling means for allowing a visual indication of the approach to zero of the weight of the quantity which should be loaded on said pan.

2. A weight measuring balance according to claim 1, wherein the signal furnished by said gauge is directed, after amplification to a comparator (C1) which controls a timing signal generator (CL1), the pulses of which are added or subtracted by a first counter (T1) according to the direction of imbalance of the pan, wherein said comparator (C1) compares the signal furnished by said gauge with an analog signal proportional to the count of said counter (T1), after digital to analog conversion, so that the variations of said first counter (T1) is therefore equal to the variation of the load being measured, and further comprising a second counter (T2) coupled to said first counter (T1), for displaying the value of the load by said first display (V1).

3. A weight measuring balance according to claim 2, wherein said comparator is connected to said timing signal generator (CL1) through a filter and a threshold circuit, such that said first counter (T1) counts up or down only when the imbalance exceeds a value such as a half a division on the weight scale.

4. A weight measuring balance according to claim 2, including a time lag register (S1) to store the value entered on said keyboard, said register (S1) presetting a third counter (T3) whose contents are displayed on said second display (V2), a circuit connected to transmit to said third counter (T3) the same timing signals transmitted to said second counter (T2), and a circuit connected to transmit to said third counter (T3) counting direction signals in an opposite sense with respect to those transmitted to said second counter (T2).

5. A weight measuring balance according to claim 2, wherein said means for subtracting includes a subtraction circuit, coupled to the value of the last cumulative total which appears on said first display (V1) and coupled to the value of the new cumulative total entered on the keyboard and which appears on said second display (V2), for subtracting the values of said first and second displays (V1 and V2), and comprising:
   a. a memory (M1) in which the contents of said second counter (T2) is temporarily stored; and,
   b. an auxiliary timer (CL2) triggered by a subtraction switch (ST), which controls the subtraction of said second and third counters (T2 and T3), so that said third counter (T3) decreases by a value equal to that originally contained in said second counter (T2), said second counter (T2) being reloaded, at the end of the operation, with the contents of said memory (M1).

* * * * *